(12) United States Patent
Buckley et al.

(10) Patent No.: US 10,739,539 B2
(45) Date of Patent: *Aug. 11, 2020

(54) PHOTONIC INTEGRATED CIRCUIT WITH ACTIVE ALIGNMENT

(71) Applicant: Juniper Networks, Inc., Sunnyvale, CA (US)

(72) Inventors: Brandon W. Buckley, Santa Barbara, CA (US); Brian Robert Koch, Brisbane, CA (US); John Garcia, Santa Barbara, CA (US); Jared Bauters, Santa Barbara, CA (US); Sudharsanan Srinivasan, Goleta, CA (US); Anand Ramaswamy, Pasadena, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,780

(22) Filed: Mar. 15, 2019

(65) Prior Publication Data
US 2019/0212505 A1    Jul. 11, 2019

Related U.S. Application Data

(63) Continuation of application No. 15/864,271, filed on Jan. 8, 2018, now Pat. No. 10,281,663.

(51) Int. Cl.
*G02B 6/42* (2006.01)
*G02B 6/43* (2006.01)
(Continued)

(52) U.S. Cl.
CPC .............. *G02B 6/4227* (2013.01); *G02B 6/12* (2013.01); *G02B 6/30* (2013.01); *G02B 6/43* (2013.01);
(Continued)

(58) Field of Classification Search
None
See application file for complete search history.

(56) References Cited

U.S. PATENT DOCUMENTS 5,450,508 A    9/1995    Decusatis et al.
6,188,472 B1   2/2001    Gage et al.
(Continued)

OTHER PUBLICATIONS

"U.S. Appl. No. 15/864,271, Examiner Interview Summary dated Dec. 17, 2018", 8 pgs.
(Continued)

*Primary Examiner* — Michael Stahl
(74) *Attorney, Agent, or Firm* — Schwegman Lundberg & Woessner, P.A.

(57) ABSTRACT

An example photonic integrated circuit includes a transmitter circuit with a optical communication path to an optical coupler configured to couple with an optical fiber. The optical communication path has a propagation direction away from the transmitter circuit and towards the optical coupler. A counter-propagating tap diverts light sent by a light source backward against the propagation direction of the optical communication path. A photodiode receives the diverted light and measures its power level. The photodiode generates a feedback signal for the optical coupler and provides the feedback signal to the optical coupler. The optical coupler receives the feedback signal and adjusts a coupling alignment of the optical communication path to the optical fiber based on the feedback signal, which indicates the measured power level of the diverted counter-propagating light.

20 Claims, 8 Drawing Sheets

(51) Int. Cl.
  *G02B 6/30*   (2006.01)
  *H04B 10/25*  (2013.01)
  *G02B 6/12*   (2006.01)
  *H04B 10/40*  (2013.01)

(52) U.S. Cl.
  CPC ......... *H04B 10/2504* (2013.01); *H04B 10/40* (2013.01)

(56) References Cited

U.S. PATENT DOCUMENTS

| | | |
|---|---|---|
| 6,580,858 B2 | 6/2003 | Chen et al. |
| 6,654,523 B1 | 11/2003 | Cole |
| 8,346,037 B2 | 1/2013 | Pezeshki et al. |
| 9,513,447 B1 | 12/2016 | Celo et al. |
| 10,281,663 B1 * | 5/2019 | Buckley ............... G02B 6/12 |
| 2002/0085806 A1 | 7/2002 | Pezeshki et al. |
| 2003/0169422 A1 | 9/2003 | Mukai |
| 2014/0348513 A1 | 11/2014 | Bolle |
| 2016/0202432 A1 | 7/2016 | Chen et al. |

OTHER PUBLICATIONS

"U.S. Appl. No. 15/864,271, Non Final Office Action dated Oct. 30, 2018".

"U.S. Appl. No. 15/864,271, Notice of Allowance dated Jan. 29, 2019", 8 pgs.

"U.S. Appl. No. 15/864,271, Response filed Jan. 4, 2019 to Non Final Office Action dated Oct. 30, 2018", 17 pgs.

* cited by examiner

PHOTONIC INTEGRATED CIRCUIT WITH ACTIVE ALIGNMENT

PRIORITY

This application is a continuation of U.S. patent application Ser. No. 15/864,271, filed Jan. 8, 2018, which is incorporated by reference herein in its entirety.

TECHNICAL FIELD

The subject matter disclosed herein generally relates to the technical field of integrated circuits, such as photonic integrated circuits, and to the technologies by which such integrated circuits become improved compared to other integrated circuits. Specifically, the present disclosure addresses a photonic integrated circuit configured to perform active alignment.

BACKGROUND

A long-standing challenge in the technology of photonic integrated circuits (which may be referred to as "PIC") has been how to align the coupling of an integrated waveguide (which may be referred to as "WG") to an optical fiber to attain maximum or otherwise optimum communication of light from one to the other. As used herein, "active alignment" refers to the use of a feedback signal (e.g., proportional to or otherwise based on a measurement of optical power in the waveguide) to determine (e.g., set or adjust, once or repeatedly) the coupling alignment between the waveguide and the optical fiber (e.g., for maximum or otherwise optimum communication of optical power across the coupling). In contrast, "passive alignment" herein refers to determining the coupling alignment without any such feedback signal. Active alignment is a promising technique for alleviating the strict mechanical tolerances typically involved in passive alignment, as well as their associated manufacturing challenges and costs. However, generation of a suitable feedback signal that is sufficiently consistent and reliable for active alignment has been historically difficult.

BRIEF DESCRIPTION OF THE DRAWINGS

Some embodiments are illustrated by way of example and not limitation in the figures of the accompanying drawings.

DETAILED DESCRIPTION

Example methods (e.g., algorithms) facilitate active alignment of photonic integrated circuits, and example photonic integrated circuits are configured to facilitate active alignment. Example systems (e.g., special-purpose machines configured by special-purpose software) may be configured to include one or more of such example photonic integrated circuits, perform one or more of such example methods of active alignment, or both. The examples described herein merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

To perform active alignment of a waveguide to an optical fiber, it may be helpful to generate a consistent and reliable feedback signal that scales monotonically with the alignment accuracy. One approach toward this goal is illustrated in FIG. 1.

Figure 1:
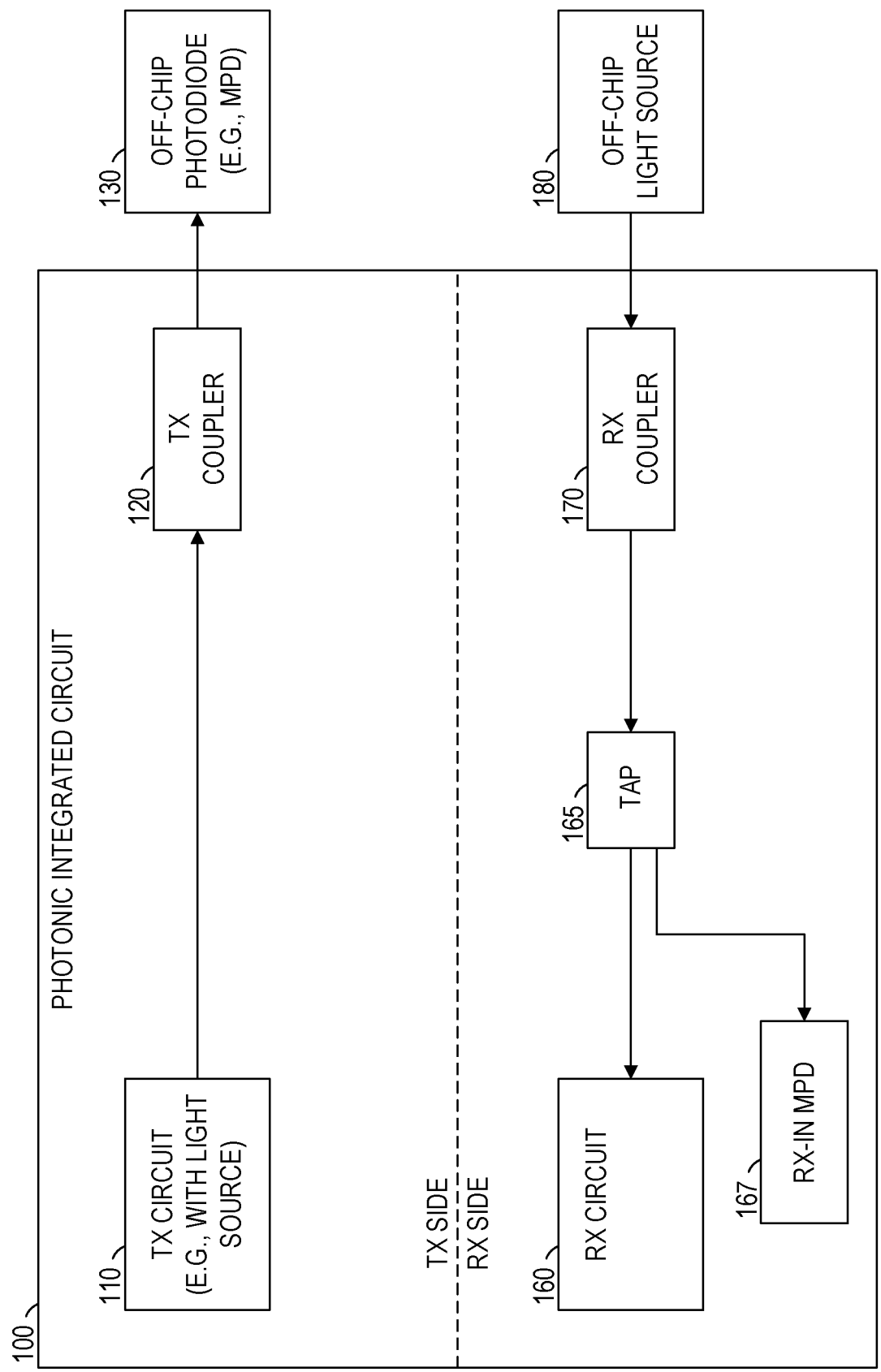
FIG. 1 is a block diagram illustrating a photonic integrated circuit, configured to perform active alignment by using a transmitter circuit's light source as the light source for the feedback signal, according to some example embodiments.

FIG. 1 is a block diagram illustrating a photonic integrated circuit 100, which is configured to perform active alignment by using light from a transmitter circuit 110 (e.g., a transmitter circuit with an integrated light source), according to some example embodiments. In other words, the transmitter circuit 110 is or includes the light source for the feedback signal that influences the determination of the coupling alignment.

As shown in FIG. 1, the photonic integrated circuit 100 has a transmitter (Tx) portion (e.g., a transmitter side or Tx side) and a receiver (Rx) portion (e.g., a receiver side or Rx side). In general, there may be one or more transmitter portions, one or more receiver portions, or any suitable combination thereof.

On the receiver portion of the photonic integrated circuit 100, an external light source (e.g., external optical signal source) in the example form of an off-chip light source 180 is the light source for the feedback signal on the receiver portion. The receiver portion includes a receiver-side coupler 170 that is configured to couple with an optical fiber (e.g., an optical reception fiber) and uses the receiver-side feedback signal to determine the coupling alignment with the optical fiber. The feedback signal may be an electrical signal or other suitable signal communicated to the receiver-side coupler 170.

An on-chip photodiode (PD) generates the feedback signal for use by the receiver-side coupler 170 in determining the coupling alignment. In some example embodiments, a receiver circuit 160 may be or include a data-receiving photodiode that is additionally configured to generate the feedback signal and provide it to the receiver-side coupler 170. However, in the example embodiments illustrated in FIG. 1, a receiver-side tap 165 diverts a portion of the optical power in the receiver-side waveguide to a receiver-side input photodiode 167 (e.g., configured to function as a power monitoring tap), and the receiver-side input photodiode 167 generates the feedback signal and provides it to the receiver-side coupler 170. Any photodiode discussed herein can be considered an example of a photodetector and may take the example form of a monitor photodiode (MPD). Other examples of a photodetector include an electro-absorption modulator (EAM), a photo transistor, and a photovoltaic cell (e.g., solar cell).

The feedback signal (e.g., from the receiver-side input photodiode 167) increases proportionally as the coupling alignment improves and more optical power couples into the receiver-side waveguide. By using an external light source, such as the off-chip light source 180, the optical power and spectrum of the light in the receiver-side waveguide can be carefully controlled for repeatable and precise alignment.

On the transmitter portion of the photonic integrated circuit 100, however, there may be no on-chip photodiode, as illustrated in FIG. 1. The transmitter portion of the photonic integrated circuit 100 includes a transmitter circuit 110, which may include a light source (e.g., an integrated light source, such as a laser source), and a transmitter-side coupler 120, which is configured to couple with an optical fiber (e.g., an optical transmission fiber).

In the example embodiments shown in FIG. 1, the transmitter side optical signal itself (e.g., laser light) may be or otherwise provide the light for the feedback signal, and an external off-chip photodiode 130 is configured to measure the optical power across the coupling and generate the feedback signal on the transmitter portion. However, there may be drawbacks with this approach. For example, it is not always certain that the optical signal and its communication path (e.g., transmission path) are functional when active alignment is to be performed (e.g., at the optical alignment stage in assembling the photonic integrated circuit 100). There is a possibility that the on-chip optical source (e.g., transmitter circuit 110 with its light source) might be emitting less light than expected or even no light at all. In such a case, it would be difficult to assess coupling losses from poor alignment when the optical output power is itself unknown.

As another example, the wavelength of light produced by the on-chip optical source (e.g., transmitter circuit 110 and with its light source) might not be precisely controlled. One or more aspects of the coupling between the transmitter-side coupler 120 and the optical fiber (e.g., the optical transmission fiber) may be dependent on the wavelength, such as when grating couplers are used, and having an imprecisely controlled or uncontrolled optical source may result in significant variations in coupling efficiency among multiple instances of the photonic integrated circuit 100 (e.g., resulting in significant part-to-part variation in coupling efficiency).

As a further example, in situations where the receiver-side optical communication path is simultaneously coupled along with the transmitter-side optical communication path, it may be beneficial for the receiver-side and transmitter-side feedback signals to match their power levels, wavelengths, response curves, or any suitable combination thereof. This way, the coupling alignment for both can be simultaneously maximized or otherwise optimized. With the two separate and different feedback systems illustrated in FIG. 1, achieving simultaneous transmitter-side and receiver-side coupling may be quite challenging.

Accordingly, it would be beneficial if the generation of the transmitter-side feedback signal used an external light source (e.g., similar to the off-chip light source 180 on the receiver portion) in a manner similar to the generation of the receiver-side feedback signal. However, on the transmitter portion, this approach would involve sending light backwards against the normally forward transmission direction of the transmitter-side optical communication path, and one or more photodiodes would need to be added to the transmitter portion of the photonic integrated circuit 100 to capture the light from the external light source.

Continuing to consider FIG. 1, on the transmitter portion of the photonic integrated circuit 100, it is possible in some situations to replace the off-chip photodiode 130 with an off-chip light source (e.g., similar to the off-chip light source 180 on the receiver portion of the photonic integrated circuit 100 and repurpose one or more portions of the transmitter circuit 110 (e.g., laser, modulator, or optical amplifier) as a photodetector to capture counter propagating light. However, repurposing such components may involve designing additional capabilities into controller electronics of the photonic integrated circuit 100 (e.g., reverse bias circuitry for laser and amplifier), which may add cost, size, or complexity to the overall design. Additionally, such repurposing of optical components not designed specifically for capturing and detecting optical power, may result in poor photodetector performance (e.g., low responsivity, large wavelength dependence, poor reliability, or poor repeatability). Furthermore, because of the difference in feedback configurations between the receiver portion and the transmitter portion, this scheme may be unable to simultaneously optimize both transmitter-side and receiver-side couplers, due to the unequal feedback response.

Figure 2:
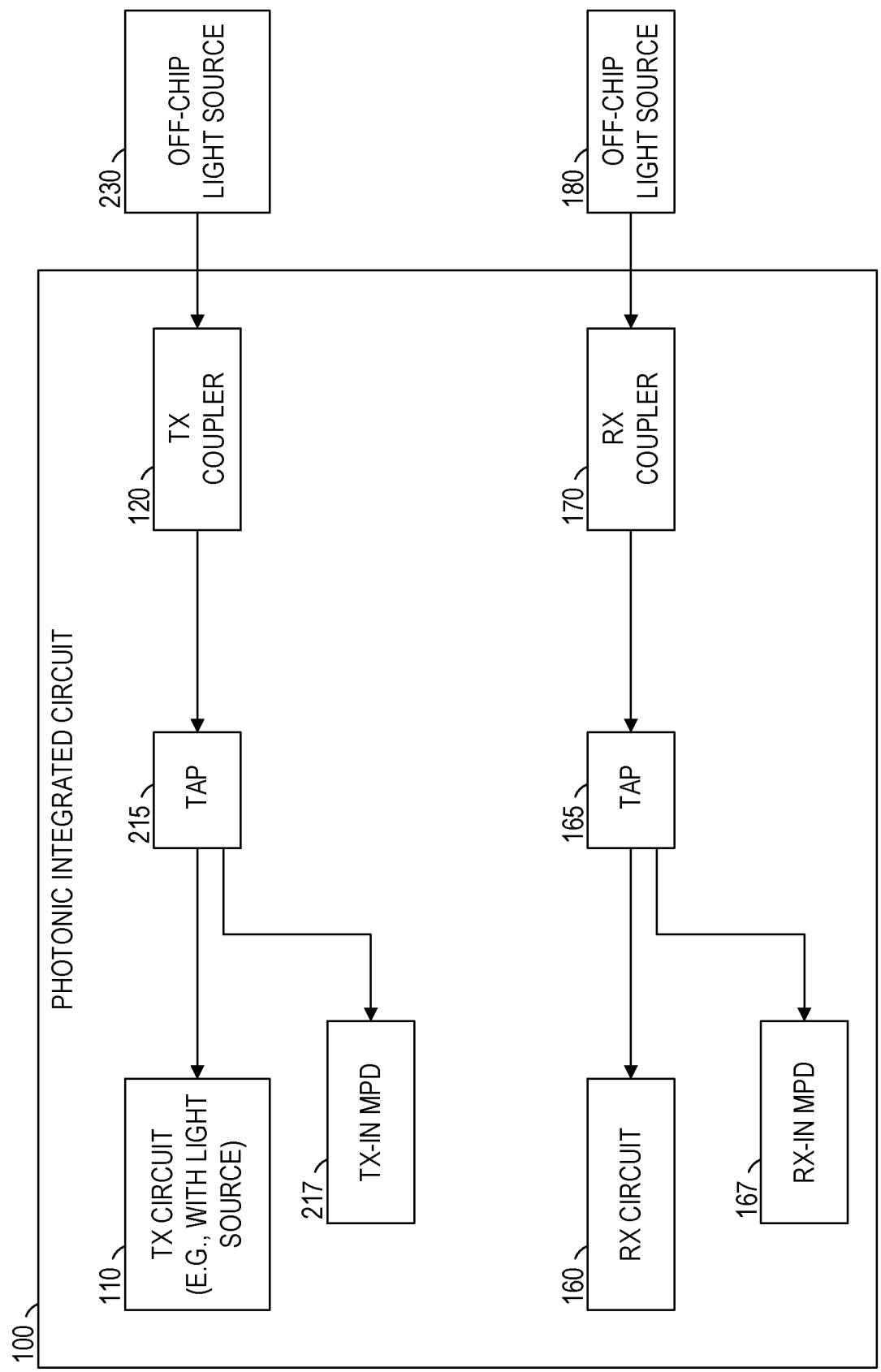
FIG. 2 is a block diagram illustrating the photonic integrated circuit, configured to perform active alignment by using an off-chip light source and a counter propagating tap, according to some example embodiments.

FIG. 2 is a block diagram illustrating the photonic integrated circuit 100, configured to perform active alignment by using an off-chip light source 230 and a counter-propagating tap 215, according to some example embodiments. In some example embodiments, the off-chip light source 230 on the transmitter portion of the photonic integrated circuit 100 is combined with the off-chip light source 180 on the receiver portion of the photonic integrated circuit 100 (e.g., such that one is or includes the other). As shown in FIG. 2, the receiver portion of the photonic integrated circuit 100 is configured similarly to that described above with respect to FIG. 1.

Specifically, as shown in FIG. 2, the receiver portion of the photonic integrated circuit 100 includes the receiver circuit 160, and the receiver circuit 160 has a receiver-side optical communication path (e.g., a communicatively coupled set of one or more receiver-side waveguides) to the receiver-side coupler 170, which is configured to couple with an optical fiber (e.g., an optical reception fiber). As shown by arrows, the receiver-side optical communication path has a forward direction (e.g., a reception direction or forward propagation direction) away from the receiver-side coupler 170 and toward the receiver circuit 160 (e.g., toward the left edge of FIG. 2). As discussed above, the receiver-side tap 165 is configured to divert a portion of the optical power in the receiver-side optical communication path to the receiver-side input photodiode 167, which is configured to measure the in-waveguide signal strength and generate the feedback signal for the receiver-side coupler 170.

In addition, as shown in FIG. 2, the transmitter portion of the photonic integrated circuit 100 includes the transmitter circuit 110 (e.g., with a light source), and the transmitter circuit 110 has a transmitter-side optical communication path (e.g., a communicatively coupled set of one or more transmitter-side waveguides) to the transmitter-side coupler 120, which is configured to couple with an optical fiber (e.g., an optical transmission fiber). To accommodate normal operation (e.g., when the transmitter circuit 110 is transmitting data), the transmitter-side optical communication path has a forward direction (e.g., a transmission direction or forward propagation direction) away from the transmitter circuit 110 and toward the transmitter-side coupler 120 (e.g., toward the right edge of FIG. 2).

However, as configured in accordance with FIG. 2, the transmitter portion of the photonic integrated circuit 100 also includes the counter-propagating tap 215 and a transmitter-side input photodiode 217, which may be located at an output of the transmitter-side optical communication path. With this configuration, light from the off-chip light source 230 is coupled into the transmitter-side optical communication path and travels against (e.g., counter) to the forward direction of the transmitter-side optical communication path. This light from the off-chip light source 230 is tapped by the counter-propagating tap 215, which is configured to divert a portion of the optical power in the transmitter-side waveguide to the transmitter-side input photodiode 217. The transmitter-side input photodiode 217 is accordingly configured to measure the in-waveguide signal strength and generate the feedback signal for the transmitter-side coupler 120.

This approach is one technical solution that solves the technical problems associated with relying on the transmitter circuit 110 as the light source for the transmitter-side feedback signal, as described above with respect to FIG. 1. Instead, in the example embodiments illustrated in FIG. 2, the off-chip light source 230 can be chosen, designed, or otherwise configured to be very stable and repeatable in output power, wavelength, polarization, or any suitable combination thereof.

Additionally, the counter-propagating tap 215 and the transmitter-side input photodiode 217 can be chosen, designed, or otherwise configured to match the specifications of the receiver-side tap 165, the receiver-side input photodiode 167, or both, such that the transmitter-side and receiver-side feedback signals will match each other in power levels, wavelengths, response curves, or any suitable combination thereof. In such example embodiments, the receiver-side and transmitter-side alignment steps can be performed together (e.g., simultaneously).

Figure 3:
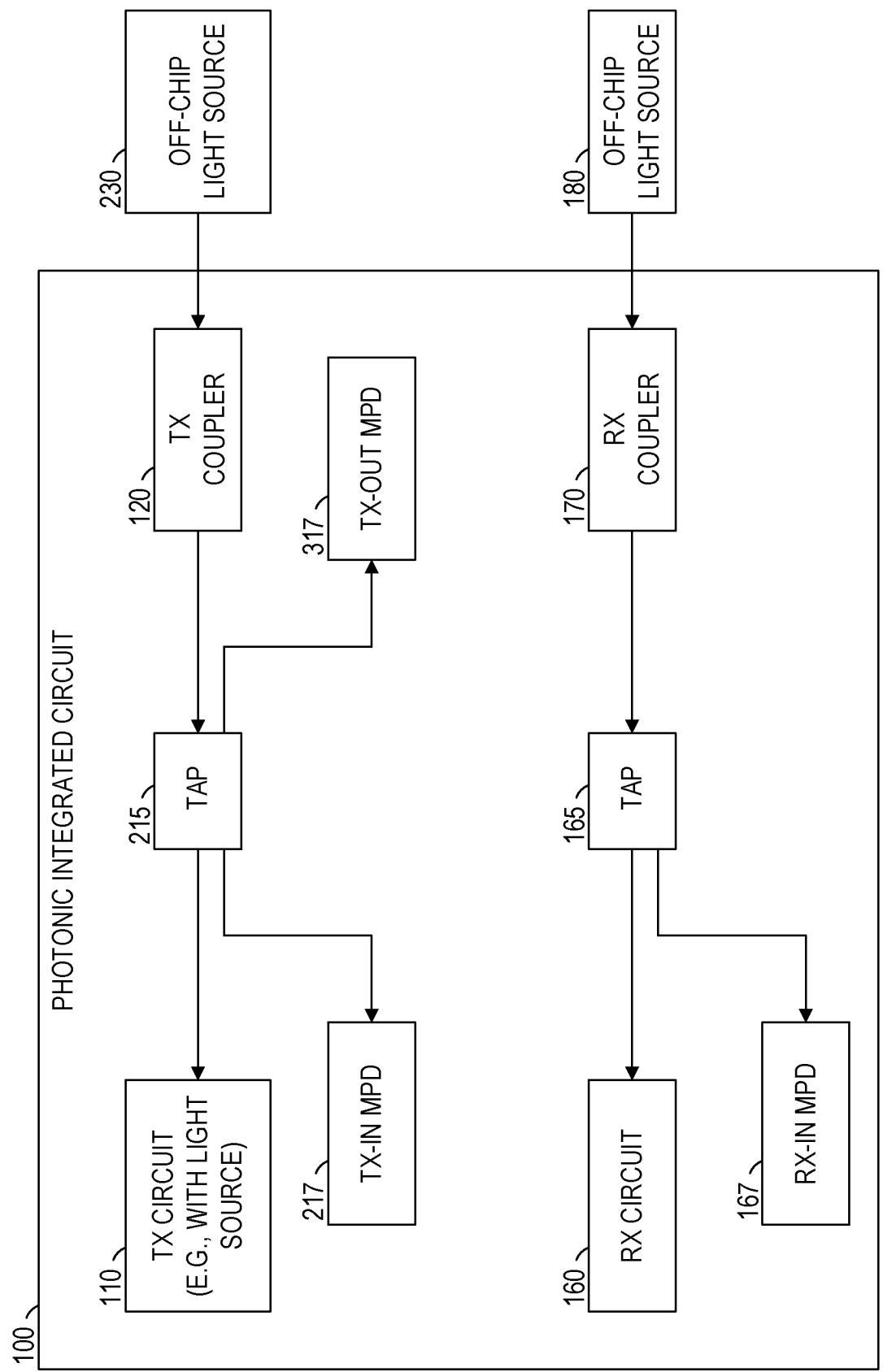
FIG. 3 is a block diagram illustrating the photonic integrated circuit, configured to perform active alignment by using an available input port of a forward-propagating transmitter-side output tap, according to some example embodiments.

FIG. 3 is a block diagram illustrating the photonic integrated circuit 100, configured to perform active alignment by using (e.g., repurposing or otherwise adapting) an available input port of a forward-propagating transmitter-side output tap 317, according to some example embodiments. As shown in FIG. 3, the receiver portion of the photonic integrated circuit 100 is configured similarly to that described above with respect to FIG. 1 and FIG. 2.

However, as configured in accordance with FIG. 3, the transmitter portion of the photonic integrated circuit 100 also provides an elegant technical solution to the technical problems associated with using the transmitter circuit 110 itself as the light source for the transmitter-side feedback signal, as described above with respect to FIG. 1. In the example embodiments illustrated in FIG. 3, an elegant aspect of this technical solution is to use (e.g., repurpose or otherwise adapt) an otherwise unused port of a transmitter-side output tap in the transmitter-side optical communication path. As shown in FIG. 3, such a transmitter-side output tap may be or include the counter-propagating tap 215 discussed above.

In many situations, before light exits the transmitter-side optical communication path, a tap and a photodiode (e.g., an MPD) are used to respectively divert and monitor the output of the photonic integrated circuit 100. The tap may be or include the counter-propagating tap 215 and may be chosen, designed, or otherwise configured to have one or more unused input ports. As shown in FIG. 3, an unused input port can be adapted as an output to the counter-propagating tap 215, such that counter-propagating light traveling against the forward direction of the transmitter-side optical communication path is fully or partially sent to the transmitter-side input photodiode 217 for active alignment purposes (e.g., to generate the transmitter-side feedback signal for the transmitter-side coupler 120). To accommodate normal operation (e.g., transmitting data), the same tap is configured to divert a portion of the optical power in the transmitter-side optical communication path to a transmitter-side output photodiode 317, which is configured to monitor the output signal. In some example embodiments, due to the symmetry of tap design, the percentage of tapped light in the forward direction for normal operation (e.g. 5%) is equal to the percentage of tapped light in the reverse direction for active alignment purposes. Accordingly, the same tap component can be more efficiently used for both normal operation and active alignment purposes, and the transmitter-side optical communication path experiences no additional loss in optical power from adding a separate tap specifically for active alignment purposes.

Figure 4:
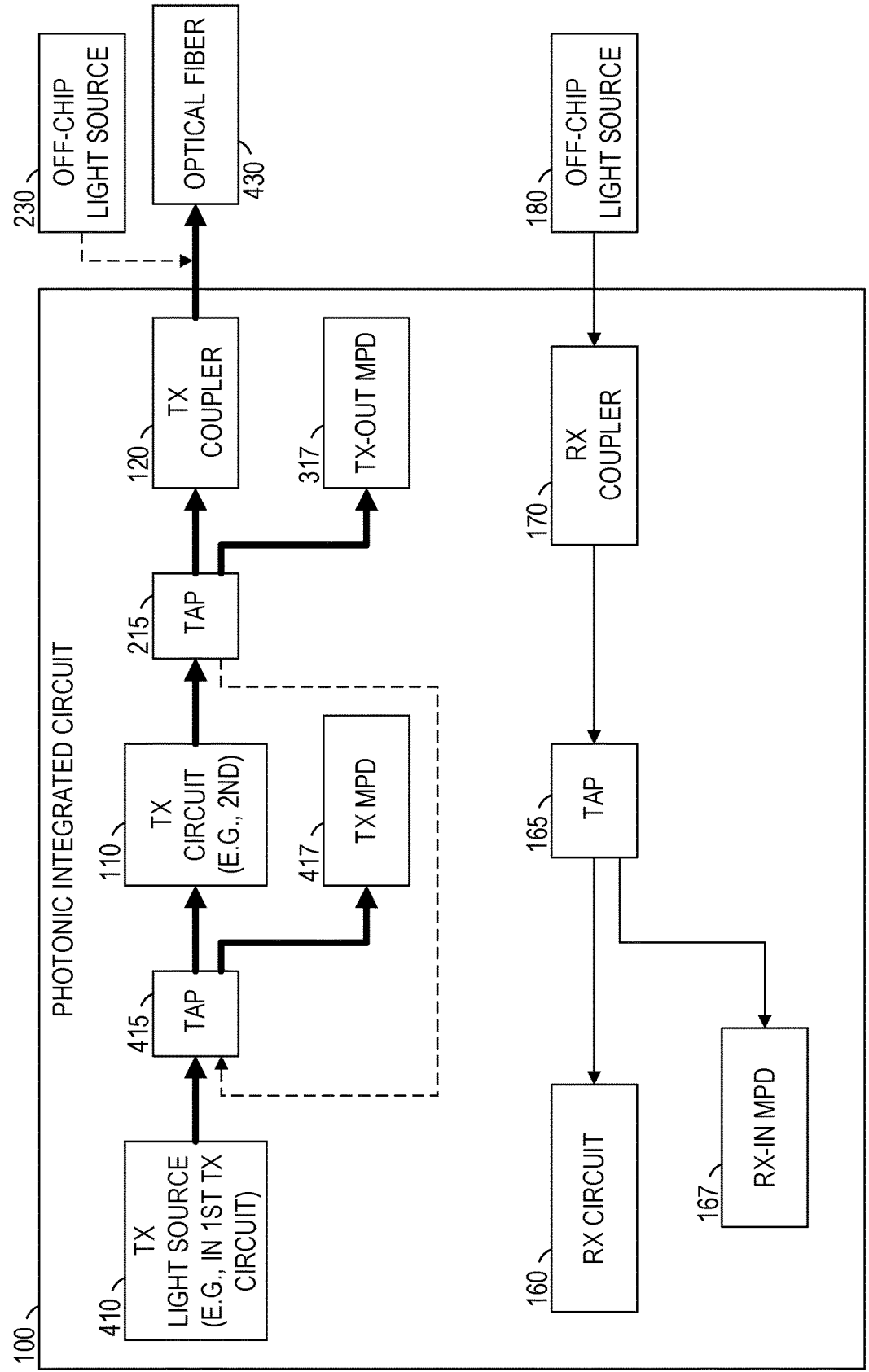
FIG. 4 is a block diagram illustrating the photonic integrated circuit, configured with multiple taps and functioning in a normal operation mode (e.g., while transmitting data), according to some example embodiments.
Figure 5:
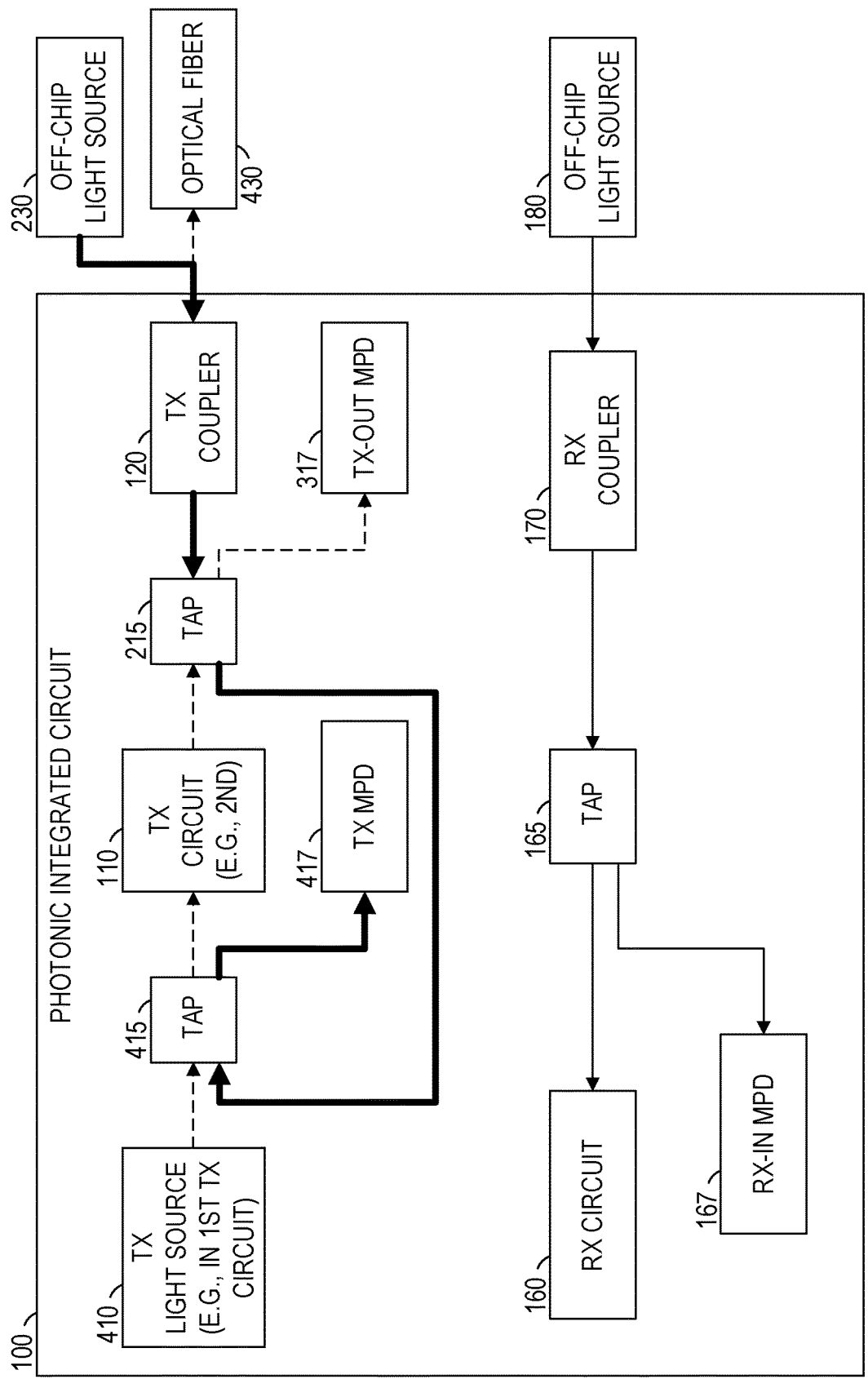
FIG. 5 is a block diagram illustrating the photonic integrated circuit, configured with multiple taps and functioning in an active alignment mode (e.g., while transmitting no data), according to some example embodiments.

FIG. 4 and FIG. 5 are block diagrams illustrating the photonic integrated circuit 100, configured with multiple taps, according to some example embodiments. In FIG. 4, the photonic integrated circuit 100 is shown functioning in a normal operation mode (e.g., transmitting data), according to certain example embodiments, and in FIG. 5, the photonic integrated circuit 100 is shown functioning in an active alignment mode (e.g., not transmitting data). As shown in both FIG. 4 and FIG. 5, the receiver portion of the photonic integrated circuit 100 is configured similar to that described above with respect to FIG. 1 and FIG. 2.

However, as configured in accordance with FIG. 4 and FIG. 5, the transmitter portion of the photonic integrated circuit 100 also provides another elegant technical solution to the technical problems from using the transmitter circuit 110 itself as the light source for the transmitter-side feedback signal, as described above with respect to FIG. 1. In the example embodiments illustrated in FIG. 4 and FIG. 5, an elegant aspect of this technical solution is to temporarily use (e.g., repurpose or otherwise adapt) a pre-existing photodiode to capture the light from a transmitter-side input tap 415.

As shown in FIG. 4, the photonic integrated circuit 100 is in the normal operation mode (e.g., outputting data off-chip via the transmitter-side optical communication path). A transmitter-side light source 410 provides (e.g., shines) forward-propagating light into the transmitter-side optical communication path. In some example embodiments, the transmitter-side light source 410 forms all or part of a first transmitter circuit. A portion of the light passes through a transmitter-side input tap 415 and proceeds to the transmitter circuit 110, which in various example embodiments may form all or part of the first transmitter circuit or alternatively may form all or part of a second transmitter circuit. In addition, the transmitter-side input tap 415 diverts a portion of the light to a transmitter-side input photodiode 417, which may be configured to monitor optical power within the transmitter-side optical communication path at a point prior to the transmitter circuit 110.

As further illustrated in FIG. 4, the output of the transmitter circuit 110 (e.g., data to be outputted from the photonic integrated circuit 100) proceeds forward to the counter-propagating tap 215. As noted above with respect to FIG. 3, the counter-propagating tap 215 may form all or part of a transmitter-side output tap that is configured to divert a portion of the optical power in the transmitter-side optical communication path to the transmitter-side output photodiode 317 (e.g., for monitoring the output signal). In FIG. 4, the thick arrows indicate propagation of light forward through the transmitter-side optical communication path, ultimately passing through the transmitter-side coupler 120 and into an optical fiber 430 coupled thereto.

As shown in FIG. 5, the photonic integrated circuit 100 of FIG. 4 is in the active alignment mode (e.g., outputting no data off-chip via the transmitter-side optical communication path). Accordingly, the transmitter-side light source 410 is not currently providing forward-propagating light into the transmitter-side optical communication path. Instead, during active alignment, the off-chip light source 230 provides counter-propagating light into the transmitter-side optical communication path. Since the counter-propagating light is travelling against the forward direction of the transmitter-side optical communication path, photodiodes thereon (e.g., transmitter-side output photodiode 317) will not receive any light at their inputs.

Accordingly, the counter-propagating tap 215 diverts some or all of the counter-propagating light to the transmitter-side input tap 415, and the output from the transmitter-side input tap 415 is sent to one of these photodiodes (e.g., transmitter-side input photodiode 417) to measure the counter-propagating optical power and generate the feedback signal for active alignment. In this way, aside from providing some additional waveguide routing, this active alignment solution can be implemented without adding any extra components to the photonic integrated circuit 100. In FIG. 5, the thick arrows indicate propagation of light backward through the transmitter-side optical communication path, with the exception of forward propagation from the transmitter-side input tap 415 to the transmitter-side input photodiode 417.

Figure 6:
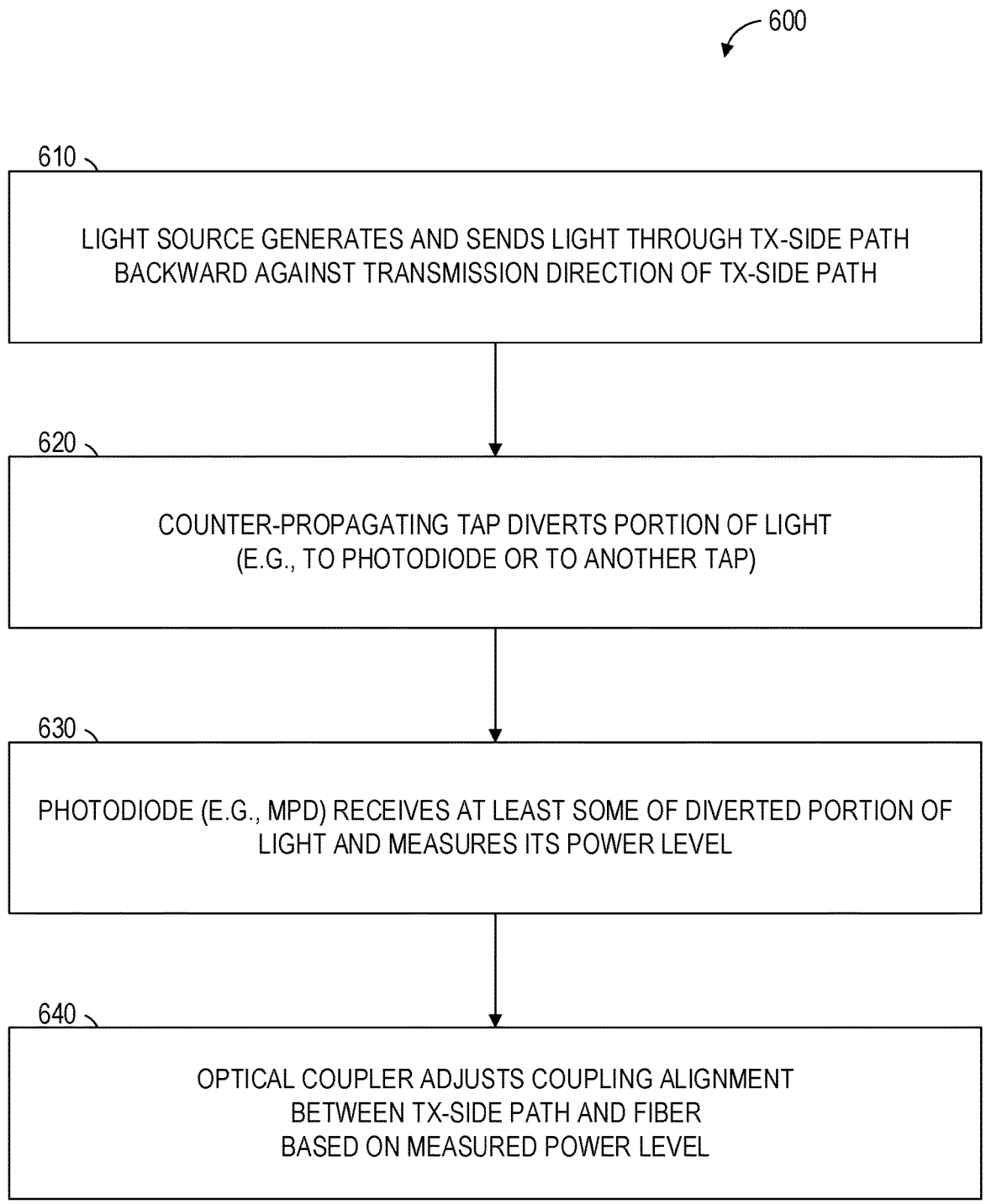
FIGS. 6-8 are flowcharts illustrating operations of the photonic integrated circuit in performing a method of active alignment, according to some example embodiments.
Figure 7:
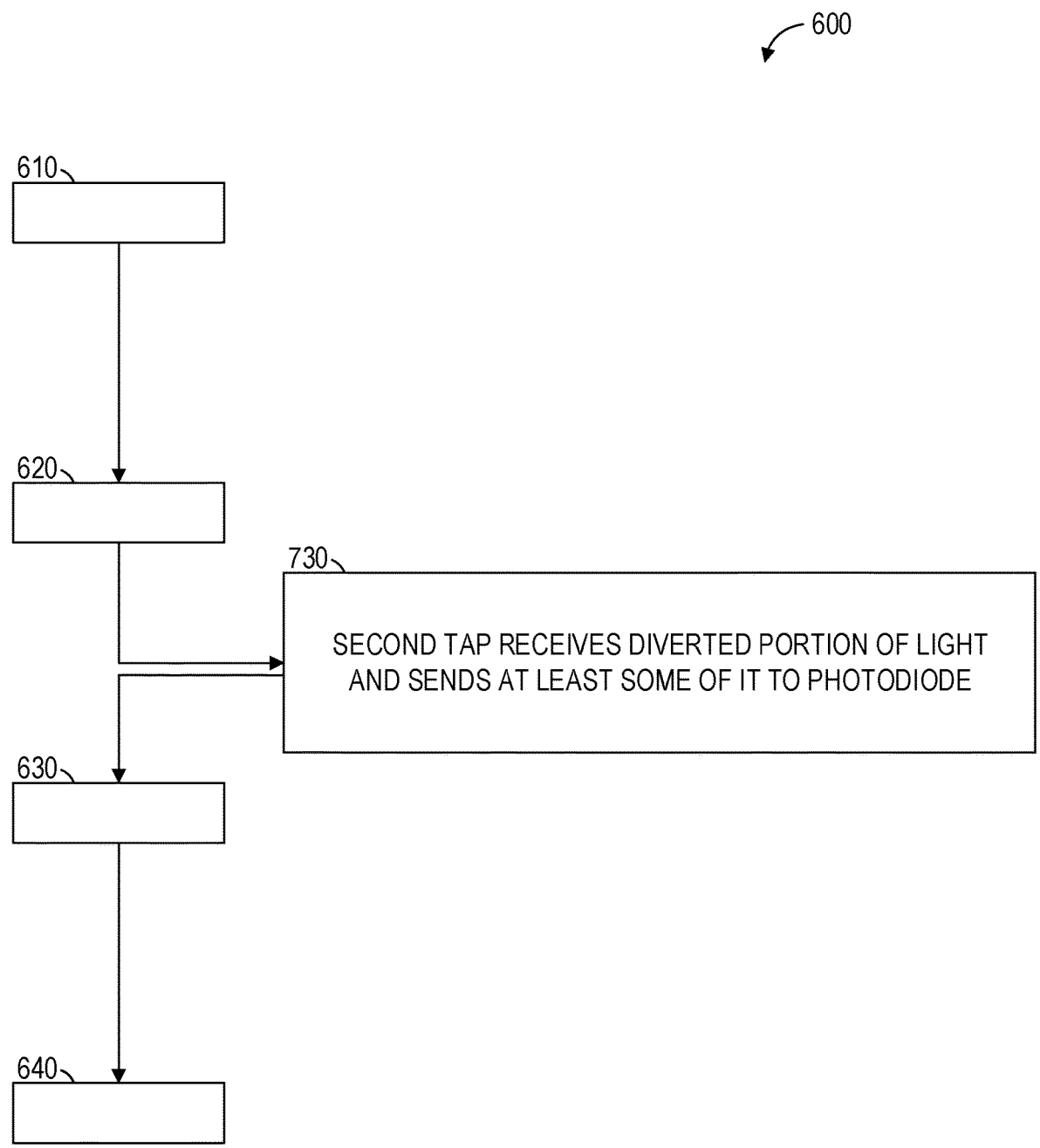
Figure 8:
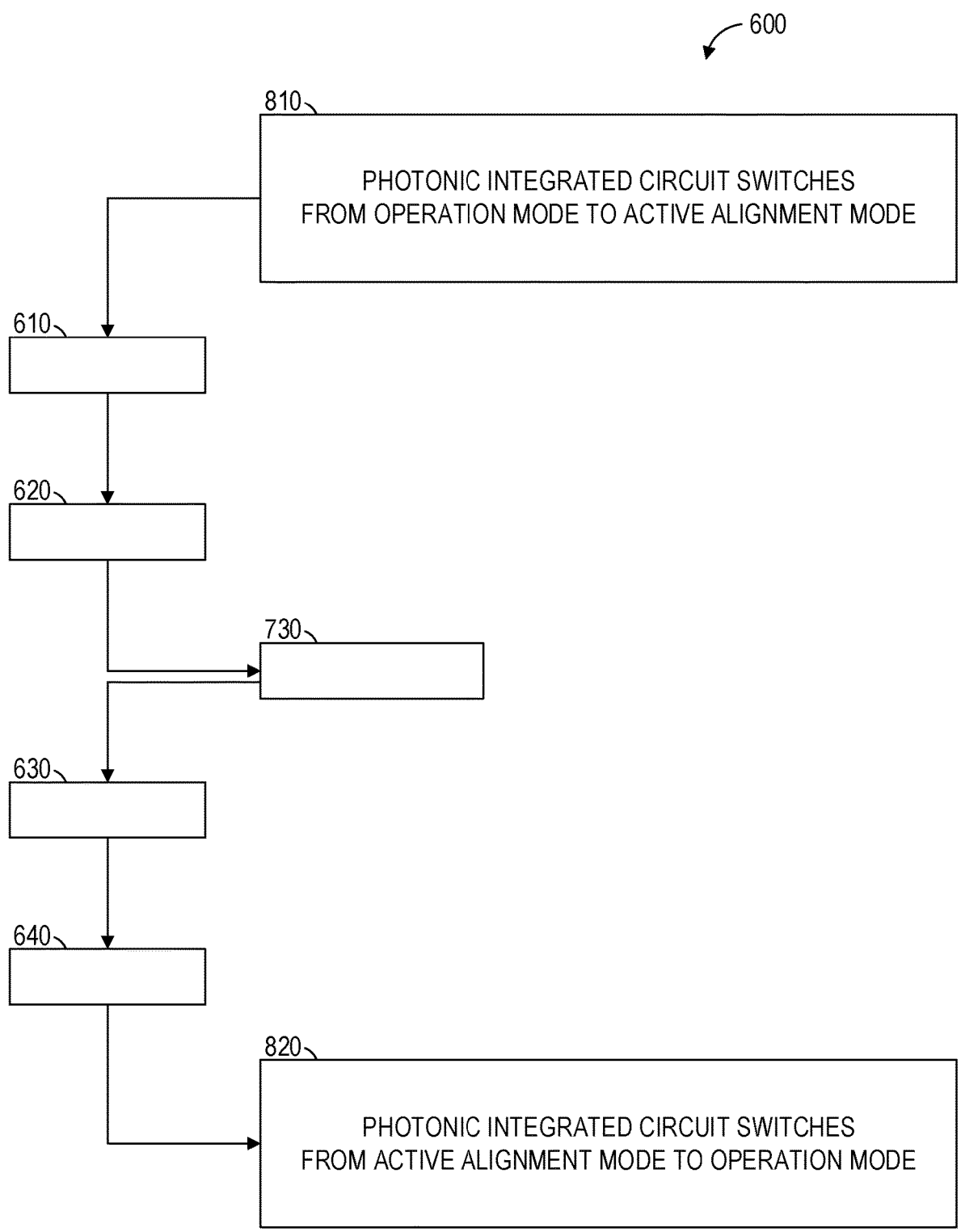

FIGS. 6-8 are flowcharts illustrating operations of the photonic integrated circuit 100 in performing a method 600 of active alignment, according to some example embodiments. For clarity and brevity, the method 600 is presently described with reference to components discussed above with respect to FIGS. 2-5. In general, however, the method 600 may be performed by any system (e.g., computer system), machine (e.g., device), processor (e.g., photonic integrated circuit 100), or circuitry configured to perform at least operations 610, 620, 630, and 640 of the method 600. According to various example embodiments, such a system, machine, processor, or circuitry may be, include, or otherwise be implemented in special-purpose (e.g., specialized or otherwise non-conventional and non-generic) hardware that has been modified to perform one or more of the functions described herein.

For example, a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the structures and methods discussed herein provides an improvement to the technology of similar special-purpose machines.

As another example, the photonic integrated circuit 100 may form all or part of a special-purpose integrated circuit able to implement any one or more of the methodologies described herein, as discussed above with respect to FIGS. 2-5, and such a special-purpose integrated circuit may accordingly be a means for performing any one or more of the methodologies discussed herein. Within the technical field of such special-purpose integrated circuits, a special-purpose integrated circuit that has been specially modified (e.g., configured by special-purpose software) by the structures discussed herein to perform the functions discussed herein is technically improved compared to other special-purpose integrated circuits that lack the structures discussed herein or are otherwise unable to perform the functions discussed herein. Accordingly, a special-purpose circuit configured according to the structures and methods discussed herein provides an improvement to the technology of similar special-purpose integrated circuits.

Each component described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single instance may be distributed across multiple instances.

In operation 610, the off-chip light source 230 generates and sends counter-propagating light through the transmitter-side optical communication path. As noted above, the generated counter-propagating light travels backward against the transmission direction of the transmitter-side communication path.

In operation 620, the counter-propagating tap 215 diverts at least a portion of the counter-propagating light. In some example embodiments, the diverted light is sent to a photodiode (e.g., transmitter-side input photodiode 217). In other example embodiments, the diverted light is sent to one or more further taps (e.g., transmitter-side input tap 415) for indirect provision to a photodiode (e.g., transmitter-side input photodiode 417).

In operation 630, a photodiode (e.g., transmitter-side input photodiode 217 or 417) receives at least some of the diverted portion of the counter-propagating light and measures its optical power (e.g., optical power level). This may be performed by generating the feedback signal for the transmitter-side coupler 120 based on the received portion of the counter-propagating light, and then providing the generated feedback signal to the transmitter-side coupler 120 (e.g., via a suitable circuitry).

In operation 640, the transmitter-side coupler 120 receives the feedback signal that was generated in operation 630 and uses the feedback signal to adjust the coupling alignment between the transmitter-side optical communication path and its corresponding optical fiber. The adjusting of the coupling alignment is based on the received feedback signal. That is, the transmitter-side coupler 120 determines the coupling alignment based on the measured optical power of the counter-propagating light.

As shown in FIG. 7, in addition to any one or more of the operations previously described, the method 600 may include operation 730. In operation 730, another tap (e.g., transmitter-side input tap 415) receives the diverted portion of light resulting from performance of operation 620 and provides at least some of that light to the photodiode (e.g., transmitter-side input photodiode 217 or 417) discussed above with respect operation 630. This may be performed in the manner discussed above with respect to FIG. 5.

As shown in FIG. 8, in addition to any one or more of the operations previously described, the method 600 may include one or more of operations 810 and 820. In operation 810, the photonic integrated circuit 100 switches from normal operation mode to active alignment mode. This may be performed as a precursor to operation 610, in which the off-chip light source 230 generates the counter-propagating light. In some example embodiments, the photonic integrated circuit 100 performs operation 810 by ceasing or inhibiting data transmission via the transmitter-side optical communication path. For example, as all or part of operation 810, the transmitter-side light source 410 may be switched off, and the off-chip light source 230 may be switched on.

In operation 820, the photonic integrated circuit 100 switches from active alignment mode to normal operation mode. This may be performed after operation 640, in which the transmitter-side coupler 120 adjust the coupling alignment. In some example embodiments, the photonic integrated circuit 100 performs operation 820 by starting or restarting data transmission via the transmitter-side optical communication path. For example, as all or part of operation 820, the transmitter-side light source 410 may be switched on, and the off-chip light source 230 may be switched off.

According to various example embodiments, one or more of the methodologies described herein may facilitate active alignment. Moreover, one or more of the methodologies described herein may facilitate concurrent (e.g., simultaneous) performance of active alignment for one or more transmitter portions of the photonic integrated circuit 100 with one or more receiver portions of the photonic integrated circuit 100. Hence, one or more of the methodologies described herein may facilitate improvements to the manufacturing, testing, and performance of photonic integrated circuits, as well as corresponding reductions in costs thereof, compared to capabilities of pre-existing photonic integrated circuits.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a device comprising:
a photonic integrated circuit that includes:
a transmitter circuit with a transmitter-side optical communication path to a transmitter-side optical coupler configured to couple with an optical transmission fiber, the transmitter-side optical communication path having a transmission direction away from the transmitter circuit and towards the transmitter-side optical coupler;
a counter-propagating tap configured to divert a portion of light sent backward against the transmission direction of the transmitter-side optical communication path; and
a photodiode configured to receive the portion of the light diverted by the counter-propagating tap and measure a power level of the diverted portion of the light sent backward against the transmission direction of the transmitter-side optical communication path; and
a light source configured to generate the light and send the light backward against the transmission direction of the transmitter-side optical communication path;
wherein the transmitter-side optical coupler is configured to adjust a coupling alignment of the transmitter-side optical communication path to the optical transmission fiber based on the measured power level of the diverted portion of the light.

A second embodiment provides a device according to the first embodiment, wherein:
the photonic integrated circuit includes a receiver circuit with a receiver-side optical communication path to a receiver-side optical coupler configured to couple with an optical reception fiber, the receiver-side optical communication path having a reception direction away from the receiver-side optical coupler and toward the receiver circuit.

A third embodiment provides a device according to the first embodiment or the second embodiment, wherein:
the transmitter-side optical communication path includes a transmitter-side optical waveguide; and
the transmitter-side optical coupler is configured to adjust the coupling alignment of the transmitter-side optical waveguide to the optical transmission fiber based on the measured power level of the diverted portion of the light.

A fourth embodiment provides a device according to any of the first through third embodiments, wherein:

the light source is a first light source configured to generate an alignment light and send the alignment light backward against the transmission direction of the transmitter-side optical communication path; and the transmitter circuit includes a second light source configured to generate a signal light and send the signal light forward in the transmission direction of the transmitter-side optical communication path.

A fifth embodiment provides a device according to the fourth embodiment, wherein:

the photodiode is an alignment photodiode configured to measure the power level of the diverted portion of the alignment light;

the counter-propagating tap is further configured to divert a portion of the signal light sent forward in the transmission direction of the transmitter-side optical communication path; and the photonic integrated circuit further includes a monitor photodiode configured to measure a power level of the diverted portion of the signal light sent forward in the transmission direction of the transmitter-side optical communication path.

A sixth embodiment provides a device according to any of the first through fifth embodiments, wherein:

the counter-propagating tap is a first optical tap configured to send the diverted portion of the light to a second optical tap included in the photonic integrated circuit; and the second optical tap is configured to send the diverted portion of the light to the photodiode configured to measure the power level of the diverted portion of the light.

A seventh embodiment provides a device according to the sixth embodiment, wherein:

the second optical tap is configured to receive and divert a portion of a signal light sent forward in the transmission direction of the transmitter-side optical communication path, the diverted portion of the signal light being provided to the photodiode; and the photodiode is further configured to measure a power level of the diverted portion of the signal light sent forward in the transmission direction of the transmitter-side optical communication path.

An eighth embodiment provides a device according to any of the first through seventh embodiments, wherein:

the measured power level of the diverted portion of the light sent backward against the transmission direction of the transmitter-side optical communication path increases monotonically with alignment accuracy between the transmitter-side optical communication path and the optical transmission fiber; and the transmitter-side optical coupler is configured to perform active alignment of the transmitter-side optical communication path to the optical transmission fiber based on the measured power level of the diverted portion of the light.

A ninth embodiment provides a photonic integrated circuit comprising:

a transmitter circuit with a transmitter-side optical communication path to a transmitter-side optical coupler configured to couple with an optical transmission fiber, the transmitter-side optical communication path having a transmission direction away from the transmitter circuit and towards the transmitter-side optical coupler;

a counter-propagating tap configured to divert a portion of light sent by a light source backward against the transmission direction of the transmitter-side optical communication path; and a photodiode configured to receive the portion of the light diverted by the counter-propagating tap and measure a power level of the diverted portion of the light sent backward against the transmission direction of the transmitter-side optical communication path;

wherein the transmitter-side optical coupler is configured to adjust a coupling alignment of the transmitter-side optical communication path to the optical transmission fiber based on the measured power level of the diverted portion of the light.

A tenth embodiment provides a photonic integrated circuit according to the ninth embodiment, wherein:

the photonic integrated circuit includes a receiver circuit with a receiver-side optical communication path to a receiver-side optical coupler configured to couple with an optical reception fiber, the receiver-side optical communication path having a reception direction away from the receiver-side optical coupler and toward the receiver circuit.

An eleventh embodiment provides a photonic integrated circuit according to the ninth embodiment or the tenth embodiment, wherein:

the transmitter-side optical communication path includes a transmitter-side optical waveguide; and the transmitter-side optical coupler is configured to adjust the coupling alignment of the transmitter-side optical waveguide to the optical transmission fiber based on the measured power level of the diverted portion of the light.

A twelfth embodiment provides a photonic integrated circuit according to any of the ninth through eleventh embodiments, wherein:

the light source is a first light source configured to generate an alignment light and send the alignment light backward against the transmission direction of the transmitter-side optical communication path; and the transmitter circuit includes a second light source configured to generate a signal light and send the signal light forward in the transmission direction of the transmitter-side optical communication path.

A thirteenth embodiment provides a photonic integrated circuit according to the twelfth embodiment, wherein:

the photodiode is an alignment photodiode configured to measure the power level of the diverted portion of the alignment light;

the counter-propagating tap is further configured to divert a portion of the signal light sent forward in the transmission direction of the transmitter-side optical communication path; and the photonic integrated circuit further includes a monitor photodiode configured to measure a power level of the diverted portion of the signal light sent forward in the transmission direction of the transmitter-side optical communication path.

A fourteenth embodiment provides a photonic integrated circuit according to any of the ninth through thirteenth embodiments, wherein:

the counter-propagating tap is a first optical tap configured to send the diverted portion of the light to a second optical tap included in the photonic integrated circuit; and the second optical tap is configured to send the diverted portion of the light to the photodiode configured to measure the power level of the diverted portion of the light.

A fifteenth embodiment provides a photonic integrated circuit according to the fourteenth embodiment, wherein:

the second optical tap is configured to receive and divert a portion of a signal light sent forward in the transmission direction of the transmitter-side optical communication path, the diverted portion of the signal light being provided to the photodiode; and the photodiode is further configured to measure a power level of the diverted portion of the signal light sent forward in the transmission direction of the transmitter-side optical communication path.

A sixteenth embodiment provides a photonic integrated circuit according to any of the ninth through fifteenth embodiments, wherein:
the measured power level of the diverted portion of the light sent backward against the transmission direction of the transmitter-side optical communication path increases monotonically with alignment accuracy between the transmitter-side optical communication path and the optical transmission fiber; and
the transmitter-side optical coupler is configured to perform active alignment of the transmitter-side optical communication path to the optical transmission fiber based on the measured power level of the diverted portion of the light.

A seventeenth embodiment provides a method (e.g., a method of performing active alignment) comprising:
by a light source, generating light and sending the light through a transmitter-side optical communication path that has a transmission direction away from a transmitter circuit and towards a transmitter-side optical coupler configured to couple with an optical transmission fiber, the light being sent backward against the transmission direction of the transmitter-side optical communication path;
by a counter-propagating tap, diverting a portion of the light sent backward against the transmission direction of the transmitter-side optical communication path;
by a photodiode, receiving the diverted portion of the light and measuring a power level of the diverted portion of the light sent backward against the transmission direction of the transmitter-side optical communication path; and
by the transmitter-side optical coupler, adjusting a coupling alignment of the transmitter-side optical communication path to the optical transmission fiber based on the measured power level of the diverted portion of the light.

An eighteenth embodiment provides a method according to the seventeenth embodiment, wherein:
the transmitter-side optical communication path includes a transmitter-side optical waveguide; and
the adjusting of the coupling alignment by the transmitter-side optical coupler includes adjusting the coupling alignment of the transmitter-side optical waveguide to the optical transmission fiber based on the measured power level of the diverted portion of the light.

A nineteenth embodiment provides a method according to the seventeenth embodiment or the eighteenth embodiment, wherein:
the counter-propagating tap is a first optical tap included in a photonic integrated circuit and configured to send the diverted portion of the light to a second optical tap included in the photonic integrated circuit; and
the method further comprises:
by the second optical tap, sending the diverted portion of the light to the photodiode configured to measure the power level of the diverted portion of the light.

A twentieth embodiment provides a method according to any of the seventeenth through nineteenth embodiments, wherein:
the measured power level of the diverted portion of the light sent backward against the transmission direction of the transmitter-side optical communication path increases monotonically with alignment accuracy between the transmitter-side optical communication path and the optical transmission fiber; and the adjusting of the coupling alignment by the transmitter-side optical coupler is performed as part of actively aligning the transmitter-side optical communication path to the optical transmission fiber based on the measured power level of the diverted portion of the light.

A twenty-first embodiment provides a photonic integrated circuit comprising:
a transmitter circuit with a first transmitter-side optical communication path to a transmitter-side optical coupler configured to couple with an optical transmission fiber;
a transmitter-side tap in the first transmitter-side optical communication path between the transmitter circuit and the transmitter-side optical coupler; and
a photodiode with a second transmitter-side optical communication path to the transmitter-side tap, the photodiode being configured to measure a power level of light that arrives from the transmitter-side tap via the second transmitter-side optical communication path;
wherein the transmitter-side optical coupler is configured to adjust a coupling alignment of the first transmitter-side optical communication path to the optical transmission fiber based on the measured power level of the light that arrived at the photodiode via the second transmitter-side optical communication path.

A twenty-second embodiment provides a carrier medium carrying machine-readable instructions for controlling a machine to carry out the method of any one of the previously described embodiments (e.g., the method of any one of the seventeenth through twentieth embodiments).

What is claimed is:
1. A device comprising:
a photonic circuit that includes:
a transmitter portion having a transmitter-side optical communication path to a transmitter-side optical coupler configured to couple with a first optical fiber, the transmitter-side optical communication path having a transmission direction away from the transmitter portion and towards the transmitter-side optical coupler;
a receiver portion having a receiver-side optical communication path to a receiver-side optical coupler configured to couple with a second optical fiber, the receiver-side optical communication path having a reception direction away from the receiver-side optical coupler and toward the receiver portion;
a counter-propagating tap configured to divert a portion of light sent backward against the transmission direction of the transmitter-side optical communication path; and
a photodiode configured to detect a power level of the diverted portion of the light sent backward against the transmission direction of the transmitter-side optical communication path; and
a light source configured to send the light backward against the transmission direction of the transmitter-side optical communication path;
wherein the transmitter-side optical coupler is configured to adjust a coupling alignment of the transmitter-side optical communication path to the first optical fiber based on the detected power level of the diverted portion of the light.

2. The device of claim 1, wherein:
the transmitter-side optical communication path includes a transmitter-side optical waveguide; and
the transmitter-side optical coupler is configured to adjust the coupling alignment of the transmitter-side optical waveguide to the first optical fiber based on the detected power level of the diverted portion of the light.

3. The device of claim 1, wherein:
the light source is a first light source configured to send an alignment light backward against the transmission direction of the transmitter-side optical communication path; and
the transmitter portion includes a second light source configured to send a signal light forward in the transmission direction of the transmitter-side optical communication path.

4. The device of claim 3, wherein:
the photodiode is an alignment photodiode configured to detect the power level of the diverted portion of the alignment light;
the counter-propagating tap is further configured to divert a portion of the signal light sent forward in the transmission direction of the transmitter-side optical communication path; and
the photonic circuit further includes a monitor photodiode configured to detect a power level of the diverted portion of the signal light sent forward in the transmission direction of the transmitter-side optical communication path.

5. The device of claim 1, wherein:
the counter-propagating tap is a first optical tap configured to send the diverted portion of the light to a second optical tap included in the photonic circuit; and
the second optical tap is configured to send the diverted portion of the light to the photodiode configured to detect the power level of the diverted portion of the light.

6. The device of claim 5, wherein:
the second optical tap is configured to divert a portion of a signal light sent forward in the transmission direction of the transmitter-side optical communication path, the diverted portion of the signal light being provided to the photodiode; and
the photodiode is further configured to detect a power level of the diverted portion of the signal light sent forward in the transmission direction of the transmitter-side optical communication path.

7. The device of claim 1, wherein:
the detected power level of the diverted portion of the light sent backward against the transmission direction of the transmitter-side optical communication path increases monotonically with alignment accuracy between the transmitter-side optical communication path and the first optical fiber; and
the transmitter-side optical coupler is configured to perform active alignment of the transmitter-side optical communication path to the first optical fiber based on the detected power level of the diverted portion of the light.

8. A photonic circuit comprising:
a transmitter portion having a transmitter-side optical communication path to a transmitter-side optical coupler configured to couple with a first optical fiber, the transmitter-side optical communication path having a transmission direction away from the transmitter portion and towards the transmitter-side optical coupler;
a receiver portion having a receiver-side optical communication path to a receiver-side optical coupler configured to couple with a second optical fiber, the receiver-side optical communication path having a reception direction away from the receiver-side optical coupler and toward the receiver portion;

a counter-propagating tap configured to divert a portion of light sent by a light source backward against the transmission direction of the transmitter-side optical communication path; and
a photodiode configured to detect a power level of the diverted portion of the light sent backward against the transmission direction of the transmitter-side optical communication path;
wherein the transmitter-side optical coupler is configured to adjust a coupling alignment of the transmitter-side optical communication path to the first optical fiber based on the detected power level of the diverted portion of the light.

9. The photonic circuit of claim 8, wherein:
the transmitter-side optical communication path includes a transmitter-side optical waveguide; and
the transmitter-side optical coupler is configured to adjust the coupling alignment of the transmitter-side optical waveguide to the optical transmission fiber based on the detected power level of the diverted portion of the light.

10. The photonic circuit of claim 8, wherein:
the light source is a first light source configured to send an alignment light backward against the transmission direction of the transmitter-side optical communication path; and
the transmitter portion includes a second light source configured to send a signal light forward in the transmission direction of the transmitter-side optical communication path.

11. The photonic circuit of claim 10, wherein:
the photodiode is an alignment photodiode configured to detect the power level of the diverted portion of the alignment light;
the counter-propagating tap is further configured to divert a portion of the signal light sent forward in the transmission direction of the transmitter-side optical communication path; and
the photonic circuit further includes a monitor photodiode configured to detect a power level of the diverted portion of the signal light sent forward in the transmission direction of the transmitter-side optical communication path.

12. The photonic circuit of claim 8, wherein:
the counter-propagating tap is a first optical tap configured to send the diverted portion of the light to a second optical tap included in the photonic circuit; and
the second optical tap is configured to send the diverted portion of the light to the photodiode configured to detect the power level of the diverted portion of the light.

13. The photonic circuit of claim 12, wherein:
the second optical tap is configured to receive and divert a portion of a signal light sent forward in the transmission direction of the transmitter-side optical communication path, the diverted portion of the signal light being provided to the photodiode; and
the photodiode is further configured to detect a power level of the diverted portion of the signal light sent forward in the transmission direction of the transmitter-side optical communication path.

14. The photonic circuit of claim 8, wherein:
the detected power level of the diverted portion of the light sent backward against the transmission direction of the transmitter-side optical communication path increases monotonically with alignment accuracy between the transmitter-side optical communication path and the first optical fiber; and the transmitter-side optical coupler is configured to perform active alignment of the transmitter-side optical communication path to the first optical fiber based on the detected power level of the diverted portion of the light.

15. A method comprising:

by a light source, sending light through a transmitter-side optical communication path that has a transmission direction away from a transmitter portion of an integrated circuit and towards a transmitter-side optical coupler configured to couple with an optical fiber, the light being sent backward against the transmission direction of the transmitter-side optical communication path;

by a first optical tap, diverting a portion of the light sent backward against the transmission direction of the transmitter-side optical communication path, the diverted portion of the light being sent to a second optical tap;

by the second optical tap, sending the diverted portion of the light to a photodiode configured to detect a power level of the diverted portion of the light;

by the photodiode, detecting the power level of the diverted portion of the light sent backward against the transmission direction of the transmitter-side optical communication path; and by the transmitter-side optical coupler, adjusting a coupling alignment of the transmitter-side optical communication path to the optical fiber based on the detected power level of the diverted portion of the light.

16. The method of claim 15, wherein:

the transmitter-side optical communication path includes a transmitter-side optical waveguide; and the adjusting of the coupling alignment by the transmitter-side optical coupler includes adjusting the coupling alignment of the transmitter-side optical waveguide to the optical fiber based on the detected power level of the diverted portion of the light.

17. The method of claim 15, wherein:

the detected power level of the diverted portion of the light sent backward against the transmission direction of the transmitter-side optical communication path increases monotonically with alignment accuracy between the transmitter-side optical communication path and the optical fiber; and the adjusting of the coupling alignment by the transmitter-side optical coupler is performed as part of actively aligning the transmitter-side optical communication path to the optical fiber based on the detected power level of the diverted portion of the light.

18. The method of claim 15, wherein:

the detected power level of the diverted portion of the light sent backward against the transmission direction of the transmitter-side optical communication path increases monotonically with alignment accuracy between the transmitter-side optical communication path and the optical fiber; and the transmitter-side optical coupler performs active alignment of the transmitter-side optical communication path to the optical fiber based on the detected power level of the diverted portion of the light.

19. A method of aligning an internal waveguide of a photonic integrated circuit (PIC) with an optical fiber, the method comprising:

receiving light, at the internal waveguide of the PIC and via the optical fiber, from a light source external to the PIC, the light propagating in the internal waveguide in an opposite direction to a transmit direction of light in an operative mode of the PIC;

feeding light, in the opposite direction, through a coupler to a tap;

coupling light, in the opposite direction, from the tap to a transmit circuit including a light source, the light source being configured to transmit light along the internal waveguide to the optical fiber in the transmit direction;

coupling light from the tap to a photodiode; and actively aligning the internal waveguide with the optical fiber based on light received by the photodiode.

20. A photonic integrated circuit (PIC) comprising:

an internal waveguide of the PIC configured to receive light from a light source external to the PIC via an optical fiber, the light propagating in the internal waveguide in an opposite direction to a transmit direction of light in an operative mode of the PIC;

a coupler configured to receive the light propagating in the opposite direction;

a tap configured to receive the light from the coupler;

a transmit circuit configured to receive light, propagating in the opposite direction, the transmit circuit including a light source configured to transmit light along the internal waveguide to the optical fiber in the operative mode; and a photodiode configured to receive light from the tap, the internal waveguide being aligned with the optical fiber based on light received by the photodiode.

* * * * *